(12) United States Patent
Kang et al.

(10) Patent No.: US 11,328,718 B2
(45) Date of Patent: May 10, 2022

(54) SPEECH PROCESSING METHOD AND APPARATUS THEREFOR

(71) Applicant: LG ELECTRONICS INC., Seoul (KR)

(72) Inventors: Pil Goo Kang, Seoul (KR); Hyeong Jin Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 16/561,275

(22) Filed: Sep. 5, 2019

(65) Prior Publication Data

US 2019/0392836 A1 Dec. 26, 2019

(30) Foreign Application Priority Data

Jul. 30, 2019 (KR) .......................... 10-2019-0092604

(51) Int. Cl.
*G10L 15/22* (2006.01)
*G10L 15/30* (2013.01)
(Continued)

(52) U.S. Cl.
CPC .......... *G10L 15/22* (2013.01); *G06F 16/3344* (2019.01); *G06F 40/211* (2020.01);
(Continued)

(58) Field of Classification Search
CPC ..... G10L 15/1815; G10L 15/22; G10L 15/26; G10L 15/30; G06F 16/3329;
(Continued)

(56) References Cited

U.S. PATENT DOCUMENTS 5,359,508 A * 10/1994 Rossides ................. G07F 17/16
705/30
9,679,568 B1 * 6/2017 Taubman ................. G10L 15/22
(Continued)

FOREIGN PATENT DOCUMENTS

KR         10-0531215 B1      11/2005
KR     10-2017-0135598 A      12/2017
WO    WO-2019072166 A1 *      4/2019   ........... G06K 9/6265

OTHER PUBLICATIONS

Google Patents translation of WO 2019/072166 A1, https://patents.google.com/patent/WO2019072166A1/en?oq=WO+2019%2f072166 (Year: 2019).*

(Continued)

*Primary Examiner* — Eric Yen
(74) *Attorney, Agent, or Firm* — Birch, Stewart, Kolasch & Birch, LLP

(57) ABSTRACT

A speech processing method and a speech processing apparatus which execute a mounted artificial intelligence (AI) algorithm and/or machine learning algorithm to perform speech processing so that electronic devices and a server may communicate with each other in a 5G communication environment are disclosed. A speech processing method according to an exemplary embodiment of the present disclosure may include collecting a user's spoken utterance including a query, generating a query text as a text conversion result for the user's spoken utterance including a query, searching whether there is a query text-spoken response utterance set including a spoken response utterance for the query text in a database which is constructed in advance, and when there is a query text-spoken response utterance set including a spoken response utterance for the query text in the database, providing the spoken response utterance included in the query text-spoken response utterance set.

15 Claims, 6 Drawing Sheets

(51) Int. Cl.
*G10L 15/18* (2013.01)
*G06F 40/30* (2020.01)
*G06F 40/211* (2020.01)
*G06F 16/33* (2019.01)
*G10L 15/26* (2006.01)

(52) U.S. Cl.
CPC .......... *G06F 40/30* (2020.01); *G10L 15/1815* (2013.01); *G10L 15/26* (2013.01); *G10L 15/30* (2013.01)

(58) Field of Classification Search
CPC .......... G06F 16/3344; G06F 16/90332; G06F 40/211; G06F 40/30
See application file for complete search history.

(56) References Cited

U.S. PATENT DOCUMENTS

| | | | | |
|---|---|---|---|---|
| 10,083,213 | B1* | 9/2018 | Podgorny | G06F 16/3329 |
| 2002/0059164 | A1* | 5/2002 | Shtivelman | H04L 12/1831 |
| 2002/0065652 | A1* | 5/2002 | Kushida | G10L 15/30 |
| | | | | 704/231 |
| 2005/0268160 | A1* | 12/2005 | Taylor | G06F 16/182 |
| | | | | 714/6.11 |
| 2005/0283474 | A1* | 12/2005 | Francis | G06F 16/3334 |
| 2005/0289164 | A1* | 12/2005 | Yoon | G06F 16/156 |
| 2006/0069546 | A1* | 3/2006 | Rosser | G10L 13/00 |
| | | | | 704/9 |
| 2007/0094032 | A1* | 4/2007 | Bennett | G10L 15/22 |
| | | | | 704/270.1 |
| 2008/0091406 | A1* | 4/2008 | Baldwin | G10L 25/51 |
| | | | | 704/4 |
| 2009/0012926 | A1* | 1/2009 | Ishikawa | G06F 16/3334 |
| | | | | 706/47 |
| 2009/0259642 | A1* | 10/2009 | Cao | G06F 16/353 |
| 2010/0191759 | A1* | 7/2010 | Li | H04L 5/02 |
| | | | | 707/759 |
| 2011/0153312 | A1* | 6/2011 | Roberts | G06F 16/3329 |
| | | | | 704/9 |
| 2011/0191099 | A1* | 8/2011 | Farmaner | G10L 15/193 |
| | | | | 704/9 |
| 2012/0143895 | A1* | 6/2012 | Salvetti | G06F 16/3329 |
| | | | | 707/769 |
| 2013/0260352 | A1* | 10/2013 | Abraham | G09B 7/02 |
| | | | | 434/350 |
| 2013/0323689 | A1* | 12/2013 | Bates | G09B 5/04 |
| | | | | 434/167 |
| 2014/0222436 | A1* | 8/2014 | Binder | G10L 17/24 |
| | | | | 704/275 |
| 2015/0294002 | A1* | 10/2015 | Corbett | G06F 16/2365 |
| | | | | 707/693 |
| 2016/0005395 | A1* | 1/2016 | Williams | G10L 15/22 |
| | | | | 704/244 |
| 2016/0247068 | A1* | 8/2016 | Lin | G06N 5/02 |
| 2017/0242651 | A1* | 8/2017 | Lang | G06F 3/165 |
| 2019/0026647 | A1* | 1/2019 | Salisbury | G09B 7/00 |
| 2019/0081980 | A1* | 3/2019 | Luo | G06F 21/53 |
| 2019/0317994 | A1* | 10/2019 | Singh | G06F 40/30 |
| 2019/0354630 | A1* | 11/2019 | Guo | G10L 15/22 |
| 2019/0370629 | A1* | 12/2019 | Liu | G06F 40/30 |
| 2020/0005780 | A1* | 1/2020 | Lu | G10L 13/027 |
| 2020/0026959 | A1* | 1/2020 | Lee | G06K 9/6271 |
| 2020/0065389 | A1* | 2/2020 | Lu | G06F 17/16 |
| 2020/0236068 | A1* | 7/2020 | TeNyenhuis | G06F 40/30 |
| 2021/0026858 | A1* | 1/2021 | Jauhari | G06F 16/24578 |
| 2021/0049195 | A1* | 2/2021 | Kawakami | G06F 16/3344 |

OTHER PUBLICATIONS

Sanliöz Özgen, H. K., & Kozak, M., "Social media practices applied by city hotels: A comparative case study from turkey.", 2015, Worldwide Hospitality and Tourism Themes, 7(3), 229-241. (Year: 2015).*

Tong, P., Zhang, Q., & Yao, J., "Leveraging domain context for question answering over knowledge graph.", 2019 Data Science and Engineering, 4(4), 323-335. (Year: 2019).*

* cited by examiner

SPEECH PROCESSING METHOD AND APPARATUS THEREFOR

CROSS-REFERENCE TO RELATED APPLICATION

This present application claims benefit of priority to Korean Patent Application No. 10-2019-0092604, entitled "SPEECH PROCESSING METHOD AND APPARATUS THEREFOR", filed on Jul. 30, 2019, in the Korean Intellectual Property Office, the entire disclosure of which is incorporated herein by reference.

BACKGROUND

1. Technical Field

The present disclosure relates to a speech processing method and a speech processing apparatus, and more particularly, to a speech processing method and a speech processing apparatus which, when a spoken response utterance corresponding to a spoken utterance including a query is constructed in a database, provide the spoken response utterance constructed in the database without performing a series of processes for generating a spoken response utterance corresponding to the query.

2. Description of the Related Art

As technology continues to advance, various services using speech recognition technology have been introduced in a number of fields in recent years. Speech recognition technology can be understood as a series of processes of understanding utterances spoken by a speaker and converting the spoken utterance to text data recognizable and usable by computers. Furthermore, the speech recognition services using such speech recognition technology may include a series of processes for recognizing user's spoken utterance and providing a service appropriate thereto.

Related art 1 discloses a charging and a payment method using a speech recognition technique in which desired information is searched for via speech, using speech recognition, speech synthesis, speaker recognition, and speaker authentication techniques, information corresponding to inputted speech is extracted to search for the corresponding information, and the information is then converted into speech, thereby simply and quickly processing a process of obtaining information through information search.

Related art 2 discloses a voice conversation system and method which provide a bidirectional conversation service with a virtual voice which is synthesized to be most similar to the speech of a specific person using a wireless/wired communication network between the specific person and a user who is interested in the specific person, so as to improve friendliness with the specific person and improve satisfaction.

According to related arts 1 and 2, whenever a speech recognition service provided by a system is used, every detailed item is charged and network access is performed. Accordingly, usage cost and network data usage may increase, and network delay may be caused.

The information described above is technical information acquired by the inventor for the contents to be disclosed or derived from the contents to be disclosed, and thus it cannot be referred to as known information disclosed to the general public prior to the filing of the contents to be disclosed.

RELATED ART DOCUMENTS

Patent Documents

Related Art 1: Korean Patent Registration No. 10-0531215 (registered on Jan. 13, 2014)
Related Art 2: Korean Patent Application Publication No. 10-2017-0135598 (published on Dec. 8, 2017)

SUMMARY OF THE INVENTION

One aspect of the present disclosure is to address the shortcoming associated with some related art discussed above in which whenever a speech recognition service is used, every detailed item is charged, thus causing usage costs to be incurred.

Another aspect of the present disclosure is to address the shortcoming associated with some related art discussed above in which whenever the speech recognition service is used, every detailed item is charged in accordance with an amount of used network data and a network delay is caused.

Yet another aspect of the present disclosure is to allow quick and inexpensive use of a speech recognition function by constructing and providing a spoken query utterance and a spoken response utterance which are frequently used in a database in advance.

Still another aspect of the present disclosure is to efficiently use limited hardware resources by deleting a query text-spoken response utterance set which has a relatively low providing frequency from the database, based on a relative providing frequency of the query text-spoken response utterance set which is constructed in advance.

Yet another aspect of the present disclosure is to address the shortcoming associated with some related art discussed above in which whenever the speech recognition service is used, every detailed item is charged, thereby causing usage costs to be incurred, by using optimal processing resources.

Yet another aspect of the present disclosure is address the shortcoming associated with some related art discussed above in which whenever the speech recognition service is used, every detailed item is charged in accordance with an amount of used network data and network delay is caused, by using an optimal process resource.

When a spoken response utterance corresponding to a spoken utterance including a query is already constructed in a database, a speech processing method according to an exemplary embodiment of the present disclosure may include providing the spoken response utterance constructed in the database without performing a series of processes for generating a spoken response utterance corresponding to the query.

Specifically, the speech processing method according to this embodiment of the present disclosure may include collecting a user's spoken utterance including a query, generating a query text as a text conversion result for the user's spoken utterance including a query, searching whether there is a query text-spoken response utterance set including a spoken response utterance for the query text in a database which is constructed in advance, and when there is a query text-spoken response utterance set including a spoken response utterance for the query text in the database, providing the spoken response utterance included in the query text-spoken response utterance set.

By providing the speech processing method according to the present disclosure, an issue in which whenever the speech recognition service is used, every detailed item is charged, thereby causing usage costs to be incurred, and an issue which whenever the speech recognition service is used, every detailed item is charged in accordance with an amount of used network data and a network delay is caused, may be solved, thereby allowing the speech recognition service to be used inexpensively and quickly.

Further, the generating of a query text may include transmitting the user's spoken utterance including a query to an external server, and receiving, from the external server, a conversion result corresponding to a query text for the user's spoken utterance including a query.

Further, the searching of whether there is a query text-spoken response utterance set may include searching a query text-spoken response utterance set group in which spoken response utterances responsive to the query text are clustered in the database, and randomly determining a query text-spoken response utterance set in the query text-spoken response utterance set group to be provided.

Further, the speech processing method according to this embodiment of the present disclosure may further include, after the providing of the spoken response utterance, updating information about the query text-spoken response utterance set in the database.

Further, the updating in the database may include: updating the information about the query text-spoken response utterance set in the database or deleting information about the query text-spoken response utterance set from the database, based on at least one of a relative providing frequency of the spoken response utterance included in the query text-spoken response utterance sets, an available storage capacity of the database, or a predetermined number of updated query text-spoken response utterance sets.

Through the updating in the database according to the present embodiment, limited hardware resources may be efficiently used.

Further, the speech processing method according to this embodiment of the present disclosure may further include, after the providing of the spoken response utterance, analyzing a relative providing frequency history of the query text-spoken response utterance sets stored in the database for every predetermined period of time, and deleting, from the database, a query text-spoken response utterance set having a relatively low relative providing frequency as an analysis result.

Through the analyzing of the relative providing frequency history and the updating in the database according to the present embodiment, limited hardware resources may be efficiently used.

Further, the speech processing method according to this embodiment of the present disclosure may further include analyzing an utterance intention of the query text when there is no query text-spoken response utterance set including a spoken response utterance for the query text in the database, generating a new response text for the analyzed utterance intention of the query text, generating a new spoken response utterance as a speech conversion result for the new response text, and providing the new spoken response utterance.

Further, the analyzing of an utterance intention of the query text may include: analyzing an utterance intention of a spoken utterance of a user who utters the query text by performing syntactic analysis or semantic analysis on the query text.

Further, the speech processing method according to this embodiment of the present disclosure may further include, after the providing of a new spoken response utterance, relatively comparing the providing frequency of the new spoken response utterance and the providing frequency of the spoken response utterance for a predetermined period of time, and updating a query text-new spoken response utterance set for the new spoken response utterance having a higher providing frequency than the providing frequency of the spoken response utterance in the database.

Further, the updating in the database may include updating the query text-new spoken response utterance set in the database or deleting the query text-new spoken response utterance set from the database, based on at least one of the relative providing frequency between the spoken response utterance and the new spoken response utterance, an available storage capacity of the database, or a predetermined number of updated query text-spoken response utterance sets.

According to another embodiment of the present disclosure, a speech processing apparatus may include a collecting unit configured to collect a user's spoken utterance including a query, a first processor configured to generate a query text as a text conversion result for the user's spoken utterance including a query, a searching unit configured to search whether there is a query text-spoken response utterance set including a spoken response utterance for the query text in a database which is constructed in advance, and a providing unit configured to, when there is a query text-spoken response utterance set including a spoken response utterance for the query text in the database, provide the spoken response utterance included in the query text-spoken response utterance set.

By providing the speech processing apparatus according to the present disclosure, an issue in which whenever the speech recognition service is used, every detailed item is charged, thereby causing usage costs to be incurred, and an issue in which whenever the speech recognition service is used, every detailed item is charged in accordance with an amount of used network data and a network delay is caused, may be solved, thereby allowing the speech recognition service to be used inexpensively and quickly.

Further, the first processor may be configured to transmit the user's spoken utterance including a query to an external server, and receive, from the external server, a conversion result corresponding to a query text for the user's spoken utterance including a query.

Further, the searching unit may be configured to search a query text-spoken response utterance set group in which spoken response utterances responsive to the query text are clustered in the database, and randomly determine a query text-spoken response utterance set in the query text-spoken response utterance set group to be provided.

Further, the speech processing apparatus according to this embodiment of the present disclosure may further include an update unit configured to update information about the query text-spoken response utterance set in the database, after the spoken response utterance has been provided.

Further, the update unit may be configured to update the information about the query text-spoken response utterance set in the database or delete the information about the query text-spoken response utterance set from the database, based on at least one of a relative providing frequency of the spoken response utterance included in the query text-spoken response utterance sets, an available storage capacity of the database, or a predetermined number of updated query text-spoken response utterance sets.

By providing the update unit according to the present embodiment, limited hardware resources may be efficiently used.

Further, the update unit may be configured to, after a spoken response utterance has been provided, analyze a relative providing frequency history of the query text-spoken response utterance sets stored in the database for every predetermined period of time, and delete, from the database, a query text-spoken response utterance set having a relatively low relative providing frequency as an analysis result.

By providing the update unit according to the present embodiment, limited hardware resources may be efficiently used.

Further, the speech processing apparatus according to this embodiment of the present disclosure may further include a second processor configured to, when there is no query text-spoken response utterance set including a spoken response utterance for the query text in the database as the searching result at the searching unit, analyze an utterance intention of the query text, generate a new response text for the analyzed utterance intention of the query text, generate a new spoken response utterance as a speech conversion result for the new response text, and transmit the new spoken response utterance to the providing unit.

Further, the second processor may be configured to analyze the utterance intention of a spoken utterance of a user who utters the query text by performing syntactic analysis or semantic analysis on the query text.

Further, the speech processing apparatus according to this embodiment of the present disclosure may further include an update unit which, after a new spoken response utterance has been provided, relatively compares a providing frequency of the new spoken response utterance and a providing frequency of the spoken response utterance for a predetermined period of time, and updates a query text-new spoken response utterance set for the new spoken response utterance having a higher providing frequency than the providing frequency of the spoken response utterance in the database.

Further, the update unit may be configured to update the query text-new spoken response utterance set in the database or delete the query text-new spoken response utterance set from the database, based on at least one of the relative providing frequency between the spoken response utterance and the new spoken response utterance, an available storage capacity of the database, or a predetermined number of updated query text-spoken response utterance sets.

In addition, another method and another system for implementing the present disclosure and a computer-readable recording medium in which a computer program for executing the method is stored may be further provided.

Other aspects, features, and advantages other than those described above will become apparent from the following drawings, claims, and the detailed description of the present disclosure.

According to the present disclosure, an issue in which whenever the speech recognition service is used, every detailed item is charged, thus causing usage costs to be incurred, and an issue in which whenever the speech recognition service is used, every detailed item is charged in accordance with an amount of used network data and a network delay is caused, may be solved, thereby allowing the speech recognition service to be used inexpensively and quickly.

Further, a query spoken utterance and a spoken response utterance which are frequently used are constructed in a database in advance and provided, thereby allowing quick and inexpensive use of the speech recognition function.

Further, limited hardware resources may be efficiently used by deleting a query text-spoken response utterance set which has a relatively low providing frequency from the database, based on a relative providing frequency of the query text-spoken response utterance set which is constructed in advance. Further, limited hardware resources may be efficiently used by updating a query text-new spoken response utterance set which is newly generated, based on at least one of a relative providing frequency of a user's query or an available storage capacity of database.

Further, even though the speech processing apparatus itself is a mass-produced uniform product, the user may recognize the speech processing apparatus as a personalized device, so that an effect as a user-customized product may be achieved.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
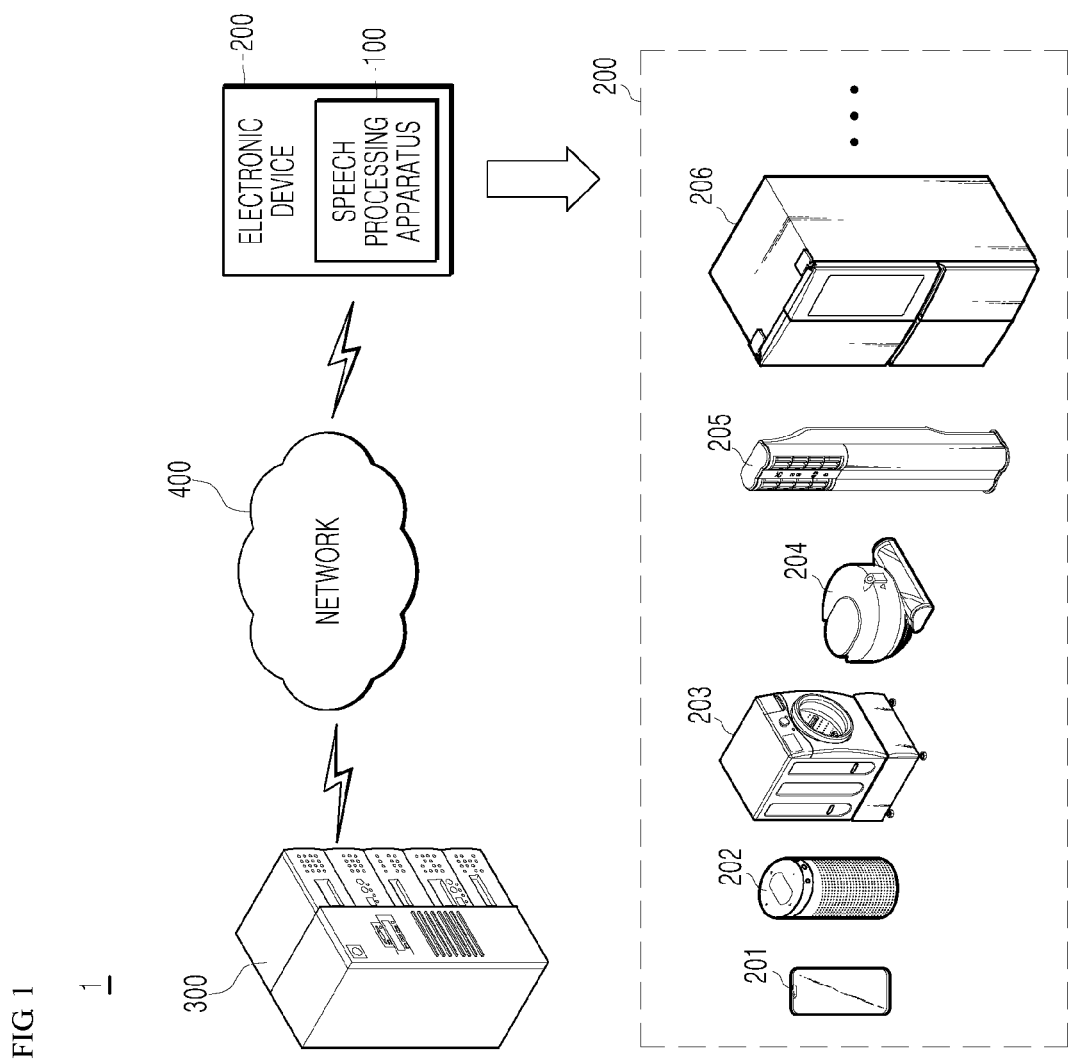
FIG. 1 is an exemplary view of a speech processing environment including an electronic device including a speech processing apparatus according to an exemplary embodiment of the present disclosure, a server, and a network connecting the above-mentioned components.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Although the terms first, second, etc. may be used herein to describe various elements, these elements should not be limited by these terms. These terms may be only used to distinguish one element from other elements.

Hereinbelow, the example embodiments of the present disclosure will be described in greater detail with reference to the accompanying drawings, and on all these accompanying drawings, the identical or corresponding elements are designated by the same reference numeral, and repeated description of the common elements will be omitted.

FIG. 1 is an exemplary view of a speech processing environment including an electronic device including a speech processing apparatus according to an exemplary embodiment of the present disclosure, a server, and a network connecting the above-mentioned components. Referring to FIG. 1, the speech processing environment 1 may include an electronic device including a speech processing apparatus 100, a server 300, and a network 400. The electronic device 100 including the speech processing apparatus 100 and the server 300 are connected to each other in a 5G communication environment.

The speech processing apparatus 100 receives, recognizes, and analyzes a spoken utterance of the user to provide a speech recognition service. Here, the speech recognition service may include receiving utterance information of a user to distinguish a wake-up word from a spoken utterance, and outputting a speech recognition processing result for the spoken utterance to be recognizable by the user.

In the present embodiment, the utterance information includes a wake-up word and a spoken utterance. The wake-up word is a specific command which activates the speech recognition function of the speech processing apparatus 100. Only when the wake-up word is included in the utterance information, the speech recognition function may be activated, and when the wake-up word is not included in the utterance information, the speech recognition function maintains an inactive state (for example, a sleep mode). The wake-up word may be set in advance to be stored in a memory 160 (see FIG. 2), to be described below.

Further, the spoken utterance is processed after activating the speech recognition function of the speech processing apparatus 100 by the wake-up word, and may include a voice command which may be actually processed by the speech processing apparatus 100 to generate an output. For example, when the user's utterance information is "Hi, LG. Turn on the air conditioner", the wake-up word is "Hi, LG" and the spoken utterance is "Turn on the air conditioner." The speech processing apparatus 100 determines presence of a wake-up word from the utterance information of the user and analyzes the spoken utterance to control an air conditioner 205 as the electronic device 200.

In the present embodiment, in a state in which a speech recognizing function is activated after receiving the wake-up word, the speech processing apparatus 100 may collect a user's spoken utterance including a query, and generate a query text as a text conversion result for the user's spoken utterance including a query. Here, the generating of the query text may include generating a text conversion result for the spoken utterance of the user in the speech processing apparatus 100 to generate a query text, or transmitting the spoken utterance of the user including a query to the server 300 by the speech processing apparatus 100 and receiving a conversion result corresponding to a query text for the user's spoken utterance including a query from the server to generate a query text.

Figure 3:
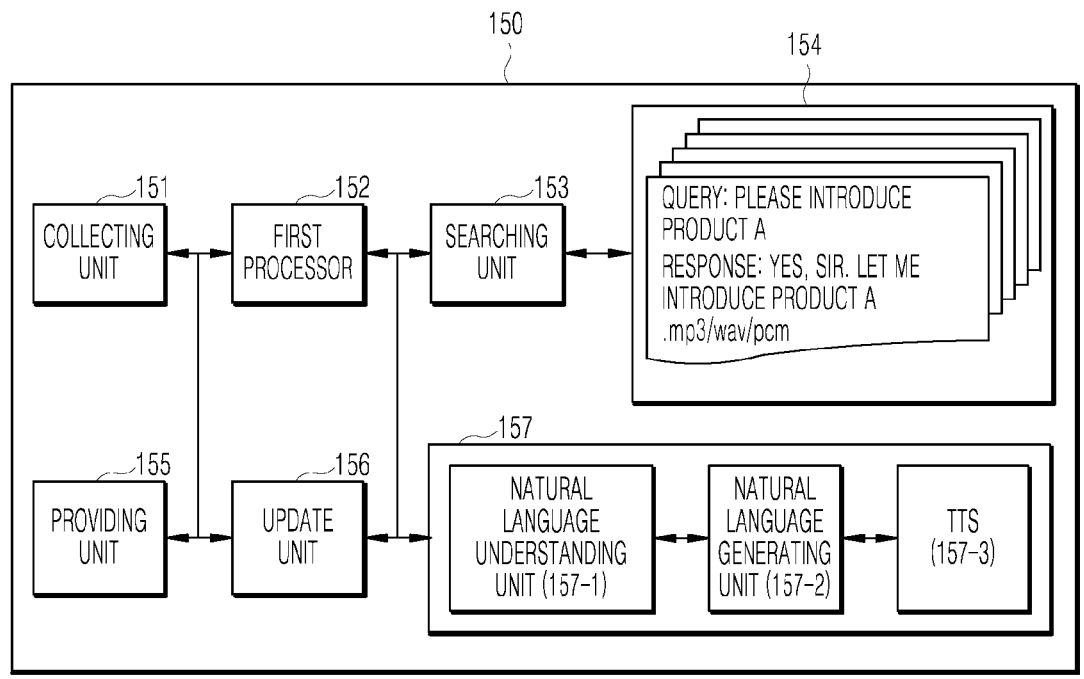
FIG. 3 is a schematic block diagram of an information processor according to an exemplary embodiment of the speech processing apparatus of FIG. 2.

The speech processing apparatus 100 searches whether there is a query text-spoken response utterance set including a spoken response utterance for a query text in an already-constructed database 154 (see FIG. 3). When there is a query text-spoken response utterance set including a spoken response utterance for the query text in the database 154, the speech processing apparatus 100 may provide the spoken response utterance included in the query text-spoken response utterance set.

In the related art, there is no database in which the query text-spoken response utterance set is constructed. Accordingly, whenever the speech processing apparatus 100 collects a spoken utterance, a complex processing process, a network delay, and incurrence of usage costs are caused in generating the spoken response utterance. However, in the present embodiment, there is a database in which the query text-spoken response utterance set is constructed, such that when the speech processing apparatus 100 collects the spoken utterance, the speech processing apparatus 100 searches for and provides a spoken response utterance from the database 154. Therefore, there is no need to perform the complex processing process for generating the spoken response utterance, and the network delay and the usage costs are not generated. Since the spoken utterance (voice command) and the response recognized and processed by the speech processing apparatus 100 are frequently repeated, the spoken utterance (voice command) and the responses which are frequently used are managed in the database 154 as a rank, and the spoken utterance in the corresponding rank is searched in the database 154 to be played back, thereby solving the issues associated with the related art.

Further, limited hardware resources may be efficiently used by deleting a query text-spoken response utterance set which has a relatively low providing frequency from the database 154, based on a relative providing frequency of the query text-spoken response utterance set which is constructed in advance. Further, updating of a query text-new spoken response utterance set which is newly generated is controlled based on at least one of a relative providing frequency in accordance with a user's query and an available storage capacity of the database 154, to efficiently use the limited hardware resources. Here, the update control may include storing a query text-new spoken response utterance set in the database 154, or deleting the query text-spoken response utterance set from the database 154.

In the present embodiment, the speech processing apparatus 100 may be included in the electronic device 200. The electronic device 200 may include various devices corresponding to Internet of Things (IoT) devices, such as a user terminal 201, an artificial intelligence speaker 202 serving as a hub which connects other electronic devices to the network 400, a washing machine 203, a robot cleaner 204, an air conditioner 205, and a refrigerator 206. However, the electronic device 200 is not limited to the examples illustrated in FIG. 1.

The user terminal 201 of the electronic device 200 may access a speech processing apparatus driving application or a speech processing apparatus driving site and then receive a service for driving or controlling the speech processing apparatus 100 through an authentication process. In the present embodiment, the user terminal 201 on which the authentication process has been completed may operate the speech processing apparatus 100 and control an operation of speech processing apparatus 100.

In the present embodiment, the user terminal 201 may be a desktop computer, smartphone, notebook, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user, but is not limited thereto. Furthermore, the user terminal 201 may be a wearable terminal having a communication function and a data processing function, such as a watch, glasses, a hairband, a ring, or the like. The user terminal 201 is not limited to the above-mentioned devices, and thus any terminal that supports web browsing may be used as the user terminal 300.

The server 300 may be a database server which provides big data required to apply various artificial intelligence algorithms and data for operating the speech processing apparatus 100. In addition, the server 300 may include a web server or an application server which remotely controls the operation of the speech processing apparatus 100 using a speech processing apparatus driving application or a speech processing apparatus driving web browser installed in the user terminal 201.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds specific models for deriving predictions and decisions from inputted data.

The server 300 may receive, from the speech processing apparatus 100, a user's spoken utterance including a query and generate a query text, and then transmit the query text to the speech processing apparatus 100. When there is no query text-spoken response utterance set including a spoken response utterance for the query text in the database 154 (see FIG. 3) of the speech processing apparatus 100, the server 300 may analyze an utterance intention of the query text, generate a new response text for the analyzed utterance intention of the query text, and generate a new spoken response utterance as a speech conversion result for the new response text to transmit the new spoken response utterance to the speech processing apparatus 100. The speech processing apparatus 100 which receives the new spoken response utterance may store a query text-new spoken response utterance set in the database 154 (see FIG. 3).

The network 400 may serve to connect the electronic device 200 including the speech processing apparatus 100 and the server 300 to each other. The network 400 may include wired networks such as local area networks (LANs), wide area networks (WANs), metropolitan area networks (MANs), or integrated service digital networks (ISDNs), and wireless networks such as wireless LANs, CDMA, Bluetooth®, or satellite communication, but the present disclosure is not limited to these examples. Furthermore, the network 400 may transmit/receive information using short-range communications and/or long-distance communications. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as the Internet and a private network such as a secure corporate private network. Access to the network 400 may be provided via one or more wired or wireless access networks. Further, the network 400 may support 5G communication and/or an Internet of things (IoT) network for exchanging and processing information between distributed components such as objects.

Figure 2:
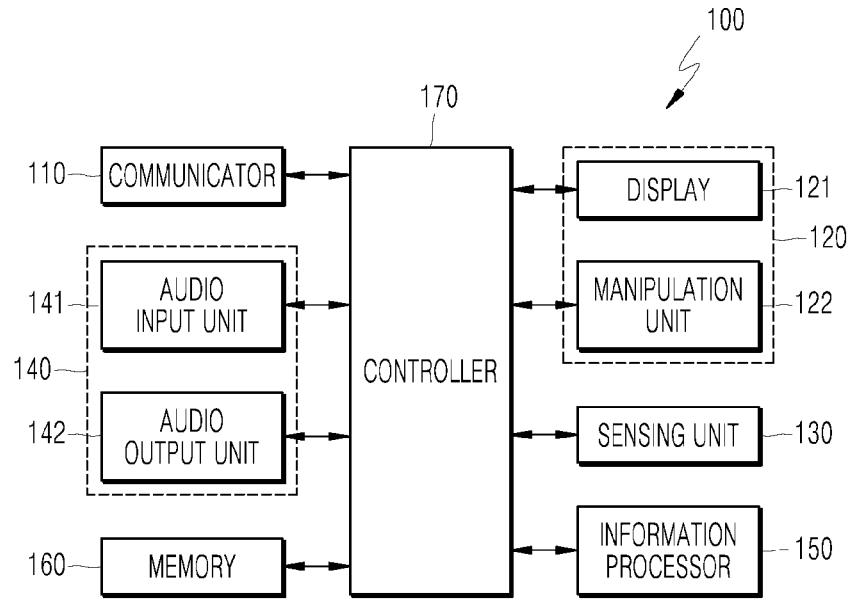
FIG. 2 is a schematic block diagram of a speech processing apparatus according to an exemplary embodiment of the present disclosure.

FIG. 2 is a schematic block diagram of a speech processing apparatus according to an exemplary embodiment of the present disclosure. In the following description, a repeated description of FIG. 1 will be omitted. Referring to FIG. 2, the speech processing apparatus 100 may include a communicator 110, a user interface 120 including a display 121 and a manipulation unit 122, a sensing unit 130, an audio processor 140 including an audio input unit 141 and an audio output unit 142, an information processor 150, a memory 160, and a controller 170.

The communicator 110 may interwork with the network 400 to provide a communication interface required to provide a transmitted/received signal between the speech processing apparatus 100 and/or the electronic devices 200 and/or the server 300 in the form of packet data. Moreover, the communicator 110 may serve to receive a predetermined information request signal from the electronic device 200 and also serve to transmit information processed by the speech processing apparatus 100 to the electronic device 200. Further, the communicator 110 may transmits the predetermined information request signal from the electronic device 200 to the server 300 and receive a response signal processed by the server 300 to transmit the signal to the electronic device 200. The communicator 110 may be a device that includes hardware and software required for transmission/reception of signals such as control signals, data signals, and so forth, with another network device through wire-based or wireless connections.

Furthermore, the communicator 110 may support a variety of object-to-object intelligent communication (such as Internet of things (IoT), Internet of everything (IoE), and Internet of small things (IoST)), and may support communication such as machine to machine (M2M) communication, vehicle to everything (V2X) communication, and device to device (D2D) communication.

The display 121 of the user interface 120 may display an operation state of the speech providing apparatus 100 under the control of the controller 170. According to an exemplary embodiment, the display 121 may form a mutual layered structure with a touch pad to be configured as a touch screen. In this case, the display 121 may also be used as the manipulation unit 122 to which information may be inputted by the touch of the user. To this end, the display 121 may be configured by a touch recognition display controller or other various input/output controllers. For example, the touch recognition display controller may provide an output interface and an input interface between the device and the user. The touch recognition display controller may transmit and receive an electrical signal to and from the controller 170. Further, the touch recognition display controller may display a visual output to the user and the visual output includes a text, a graphic, an image, a video, and a combination thereof. Such a display 121 may be a predetermined display member such as an organic light emitting display (OLED), a liquid crystal display (LCD), or a light emitting display (LED) which is capable of recognizing a touch.

The manipulation unit 122 of the user interface 120 may include a plurality of manipulation buttons (not illustrated) to transmit a signal corresponding to an input button to the controller 170. Such a manipulation unit 122 may be configured as a sensor, a button, or a switch structure which can recognize a touch or a pressing operation of the user. In the present embodiment, the manipulation unit 122 may transmit a manipulation signal which may be manipulated by a user to check or change various information related to the operation of the speech processing apparatus 100 displayed on the display 121, to the controller 170.

The sensing unit 130 may include various sensors configured to sense the surrounding situation of the speech processing apparatus 100, such as a proximity sensor (not illustrated) and an image sensor (not illustrated). The proximity sensor may obtain position data of an object (for example, a user) which is located in the vicinity of the speech processing apparatus 100 by utilizing infrared rays. The user's position data obtained by the proximity sensor may be stored in the memory 160.

The image sensor may include a camera capable of photographing the surrounding of the speech processing apparatus 100, and for more efficient photographing, a plurality of image sensors may be provided. For example, the camera may include at least one optical lens, an image sensor (for example, a CMOS image sensor) configured to include a plurality of photodiodes (for example, pixels) on which an image is formed by light passing through the optical lens, and a digital signal processor (DSP) which configures an image based on signals output from the photodiodes. The digital signal processor may generate not only a still image, but also a moving image formed by frames, each of which is configured by a still image. In the meantime, the image photographed by the camera serving as the image sensor may be stored in the memory 160.

In the present embodiment, although the sensing unit 130 is described as the proximity sensor and the image sensor, the exemplary embodiment is not limited thereto. The sensing unit 130 may include any sensors capable of sensing the surrounding situation of the speech processing apparatus 100, for example, including at least one of a Lidar sensor, a weight sensing sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). In the exemplary embodiment, the speech processing apparatus 100 may combine and utilize information sensed by at least two sensors from the above-mentioned sensors.

The audio input unit 141 of the audio processor 140 may receive utterance information of the user (for example, a wake-up word and a spoken utterance) to transmit the utterance information to the controller 170, and the controller 170 may transmit the utterance information of the user to the information processor 150. To this end, the audio input unit 141 may include one or more microphones (not illustrated). Further, a plurality of microphones (not illustrated) may be provided to more accurately receive the spoken utterance of the user. Here, the plurality of microphones may be disposed to be spaced apart from each other in different positions, and process the received spoken utterance of the user as an electrical signal.

As a selective embodiment, the audio input unit 141 may use various noise removing algorithms to remove noises generated in the middle of reception of the utterance information of the user. As a selective embodiment, the audio input unit 141 may include various components for processing the voice signal, such as a filter (not illustrated) which removes noise at the time of receiving the utterance information of the user, and an amplifier (not illustrated) which amplifies and outputs a signal outputted from the filter.

The audio output unit 142 of the audio processor 140 may output a notification message such as an alarm, an operation mode, an operation state, or an error state, response information corresponding to the utterance information of the user, and a processing result corresponding to the spoken utterance (voice command) of the user as audio, in accordance with the control of the controller 170. The audio output unit 142 may convert an electrical signal from the controller 170 into an audio signal to output the audio signal. To this end, the audio output unit 142 may include a speaker.

In a state in which a speech recognizing function is activated after receiving the wake-up word, the information processor 150 may collect the user's spoken utterance including a query, and generate a query text as a text conversion result for the user's spoken utterance including a query. The information processor 150 may search whether there is a query text-spoken response utterance set including a spoken response utterance for a query text in an already-constructed database 154 (see FIG. 3). When there is a query text-spoken response utterance set including a spoken response utterance for the query text in the database 154, the information processor 150 may provide the spoken response utterance included in the query text-spoken response utterance set.

In the present embodiment, the information processor 150 may be connected to the controller 170 to perform learning, or receive the learning result from the controller 170. In the present embodiment, the information processor 150 may be equipped at the outside of the controller 170 as illustrated in FIG. 2 or equipped in the controller 170 to operate as the controller 170, or provided in the server 300 of FIG. 1. Hereinafter, details of the information processor 150 will be described with reference to FIGS. 3 and 5.

The memory 160 stores various information required for the operation of the speech processing apparatus 100, and may include a volatile or non-volatile recording medium.

For example, in the memory 160, a predetermined wake-up word for determining the presence of the wake-up word from the spoken utterance of the user may be stored. The wake-up word may be set by a manufacturer. For example, "Hi, LG" may be set as a wake-up word, and the setting may be changed by the user. The wake-up word is inputted to activate the speech processing apparatus 100, and the speech processing apparatus 100 which recognizes the wake-up word uttered by the user may be switched to a speech recognition active state.

Further, the memory 160 may store utterance information (wake-up word and spoken utterance) of the user received by the audio input unit 141, information sensed by the sensing unit 130, and information processed by the information processor 150.

Here, the memory 160 may include a magnetic storage media or a flash storage media, but the scope of the present disclosure is not limited thereto. The memory 160 may include an embedded memory and/or an external memory and also include a volatile memory such as a DRAM, an SRAM, or an SDRAM, a non-volatile memory such as an one time programmable ROM (OTPROM), a PROM, an EPROM, an EEPROM, a mask ROM, a flash ROM, an NAND flash memory, or an NOR flash memory, a flash drive such as an SSD, a compact flash (CF) card, an SD card, a micro-SD card, a mini-SD card, an Xd card, or a memory stick, or a storage drive such as a HDD.

Here, simple speech recognition may be performed by the speech processing apparatus 100, and high-level speech recognition such as natural language processing may be performed by the server 300. For example, when a word uttered by the user is a predetermined wake-up word, the speech processing apparatus 100 may be switched to a state for receiving utterance information as a voice command. In this case, the speech processing apparatus 100 may perform only the speech recognition process for checking whether the wake-up word speech is inputted, and the speech recognition for the subsequent uttering sentence may be performed by the server 300. Since system resources of the speech processing apparatus 100 are limited, complex natural language recognition and processing may be performed by the server 300.

The controller 170 may transmit utterance information received through the audio input unit 141 to the information processor 150, and provide the speech recognition processing result from the information processor 150 through the display 121 as visual information or provide the speech recognition processing result through the audio output unit 142 as auditory information.

The controller 170 is a sort of central processor, and may drive control software installed in the memory 160 to control an overall operation of the speech processing apparatus 100. The controller 170 may include any type of device which is capable of processing data, such as a processor. Here, a processor may refer to, for example, a data processing device embedded in hardware which has a physically configured circuit to perform a function expressed by a code or a command included in a program. Examples of the data processing device built in a hardware may include, but are not limited to, processing devices such as a microprocessor, a central processor (CPU), a processor core, a multiprocessor, an application-specific integrated circuit (ASIC), a field-programmable gate array (FPGA), and the like.

In the present embodiment, the controller 170 may perform machine learning such as deep learning on the speech uttered by the user to allow the speech processing apparatus 100 to output an optimal speech recognition processing result, and the memory 160 may store data used for the machine learning and result data. Further, the controller 170 may perform the machine learning, such as deep learning, on the query text-spoken response utterance set provided by the speech processing apparatus 100 to randomly provide a response in a response group, for a similar query, rather than providing the same response.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may be configured as a deep neural network (DNN) such as a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is heavily used in natural language processing and the like, and may configure an artificial neural network structure by building up layers at each instance with a structure effective for processing time-series data which vary over a course of time. A DBN may include a deep learning structure formed by stacking up multiple layers of a deep learning scheme, restricted Boltzmann machines (RBM). A DBN has the number of layers formed by repeating RBM training. A CNN may include a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Meanwhile, the controller 170 may be provided with an artificial neural network and perform machine learning-based user recognition and user's voice tone recognition using received voice input signals as input data.

The controller 170 may include an artificial neural network, for example, a deep neural network (DNN), and train the DNN. Examples of the DNN may include CNN, RNN, DBN, and so forth. As a machine learning method for such an artificial neural network, both unsupervised learning and supervised learning may be used. The controller 170 may control to have a voice tone recognition artificial neural network structure to be updated after learning according to the setting.

Figure 4:
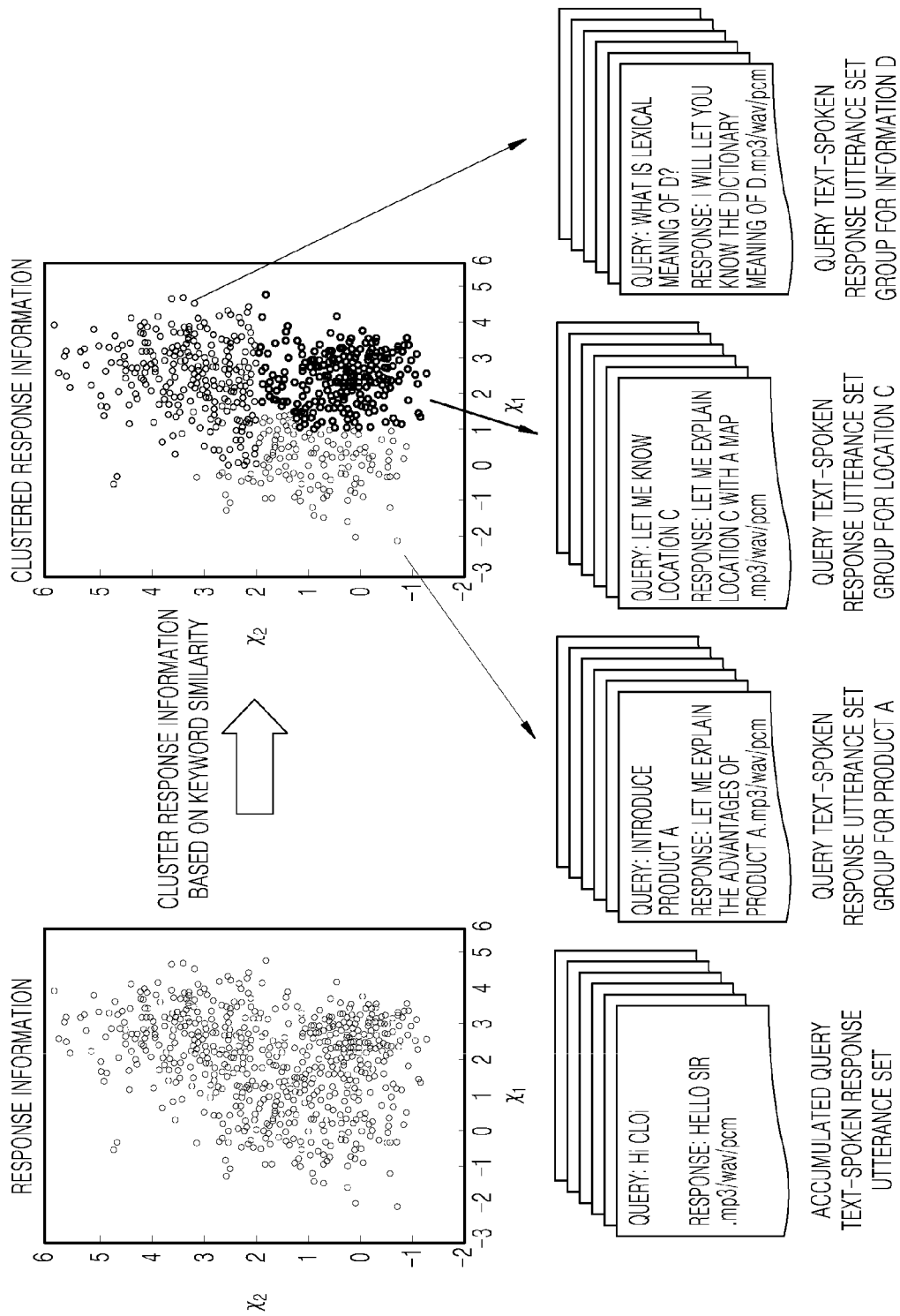
FIG. 4 is an exemplary view for explaining a query text-spoken response utterance set constructed in a database according to an exemplary embodiment of the present disclosure.

FIG. 3 is a schematic block diagram of an information processor according to an exemplary embodiment of the speech processing apparatus of FIG. 2, and FIG. 4 is an exemplary view for explaining a query text-spoken response utterance set constructed in a database according to an exemplary embodiment of the present disclosure. In the following description, a repeated description of FIGS. 1 to 2 will be omitted. Referring to FIGS. 3 and 4, the information processor 150 according to the exemplary embodiment may include a collecting unit 151, a first processor 152, a searching unit 153, a database 154, a providing unit 155, an update unit 156, and a second processor 157. The information processor 150 illustrated in FIG. 3 may perform a series of processes for speech recognition, for example, speech to text conversion, natural language understanding, natural language generation, and text-speech conversion, in the speech processing apparatus 100.

The collecting unit 151 may collect the user's spoken utterance including a query. Here, the user's spoken utterance including a query may include a question type voice command which is uttered by the user in order to receive a spoken response utterance. The collecting unit 151 may collect the spoken utterance of the user input by the audio input unit 141.

The first processor 152 may generate a query text as a text conversion result for the user's spoken utterance including a query. In the present embodiment, the first processor 152 may include an automatic speech recognition (ASR) unit (not illustrated) which performs speech to text (STT) conversion. The automatic speech recognition unit may convert the user's spoken utterance including a query, which is inputted through the audio input unit 141, into a query text. For example, the automatic speech recognition unit may include an utterance recognition unit. The utterance recognition unit may include an acoustic model and a language model. For example, the acoustic model may include vocalization-related information, and the language model may include unit phoneme information and information about a combination of the unit phoneme information. The utterance recognition unit may convert the user's spoken utterance including a query into a query text using the vocalization-related information and information about the unit phoneme information. Information about the acoustic model and language model may be stored, for example, in an automatic speech recognition database (not illustrated) in the automatic speech recognition unit.

The searching unit 153 may search whether there is a query text-spoken response utterance set including a spoken response utterance for the query text in the already constructed database 154. Here, the query text may include visual information, and the spoken response utterance may include auditory information.

Referring to FIG. 4, a query text-spoken response utterance set group in which spoken response utterances responsive to the query text are clustered may be stored in the database 154. The controller 170 may cluster the spoken response utterances based on a similarity of response keywords to generate the query text-spoken response utterance set group, and store the query text-spoken response utterance set group in the database 154.

For example, when the query text is "What is the lexical meaning of D?", there may be a plurality of spoken response utterances (for example, "The dictionary meaning of D is A", "The dictionary meaning of D is a", and "The dictionary meaning of D is AA") for the above-described query text, and the plurality of spoken response utterances may be similar to each other. By doing this, the spoken response utterances for the query text "What is the dictionary meaning of D?" may be clustered into three, and the text-spoken response utterance set group may be generated as "What is the dictionary meaning of D?"—"The dictionary meaning of D is A", "What is the dictionary meaning of D?"—"The dictionary meaning of D is a", and "What is the dictionary meaning of D?"—"The dictionary meaning of D is AA", and be stored in the database 154.

The searching unit 153 may search for a query text-spoken response utterance set group stored in the database 154 in response to the query text, and randomly determine a query text-spoken response utterance set in the query text-spoken response utterance set group.

As described above, when there is a query text-spoken response utterance set in the database 154, the providing unit 155 may provide a spoken response utterance included in the query text-spoken response utterance set. The providing unit 155 may transmit the spoken response utterance to the audio output unit 142, and the audio output unit 142 may output the spoken response utterance so that the user can hear it.

After the providing unit 155 has provided the spoken response utterance, the update unit 156 may update information about the query text-spoken response utterance set in the database 154. Here, the information about the query text-spoken response utterance set may include a providing frequency for providing a providing frequency history (to be described below), that is, the number of times that the query text-spoken response utterance set has been provided. The update unit 156 may analyze a relative providing frequency history of the query text-spoken response utterance sets from the database 154. When the providing frequency of the query text-spoken response utterance set is relatively low, for example, lower than a predetermined number of times (for example, lower than three times), as the analysis result of the providing frequency history of the query text-spoken response utterance set, the update unit 156 may delete the query text-spoken response utterance set from the database 154. Further, the update unit 156 may update the information about the query text-spoken response utterance set in the database 154 or delete the information about the query text-spoken response utterance set from the database 154, based on at least one of the relative providing frequency of the spoken response utterance included in the query text-spoken response utterance sets, an available storage capacity of the database 154, and a predetermined number of updated query text-spoken response utterance sets (for example, 20). For example, when a providing frequency of any one spoken response utterance included in the query text-spoken response utterance sets is lower than a providing frequency of another spoken response utterance for a predetermined period of time (for example, a week), the query text-spoken response utterance set including the any one spoken response utterance may be deleted from the database 154. As a selective embodiment, when an available storage capacity of the database 154 exceeds a predetermined capacity, the updating of the query text-spoken response utterance set in the database 154 is stopped, and the query text-spoken response utterance set may be deleted in accordance with the relative providing frequency. As a selective embodiment, when the number of updated query text-spoken response utterance sets exceeds the predetermined number of updated query text-spoken response utterance sets (for example, 20), the updating of the query text-spoken response utterance sets in the database 154 is stopped, and the query text-spoken response utterance set may be deleted in accordance with the relative providing frequency. When there is no query text-spoken response utterance set including a spoken response utterance for the query text in the database 154 as the searching result of the searching unit 153, the second processor 157 may analyze the utterance intention of the query text, generate a new response text for the analyzed utterance intention of the query text, and generate a new spoken response utterance as a speech conversion result for the new response text, and transmit the spoken response utterance to the providing unit 155. In the present embodiment, the second processor 157 may include a natural language understanding unit 157-1, a natural language generating unit 157-2, and a text to speech converting unit 157-3.

The natural language understanding unit 157-1 may perform syntactic analysis and semantic analysis on the query text so as to analyze the utterance intention of the user for the spoken utterance including a query. Here, according to the syntactic analysis, the query text may be divided into syntactic units (for example, words, phrases, and morphemes) and a type of syntactic element of the divided units may be identified. Further, the semantic analysis may be performed using, for example, semantic matching, rule matching, or formula matching. By doing this, the natural language understanding unit 157-1 may obtain an intention of the query text and a parameter required to express the intention.

The natural language generating unit 157-2 may generate a new response text using a knowledge-base, based on the utterance intention analyzed by the natural language understanding unit 157-1.

The text to speech (TTS) converting unit 157-3 may generate a spoken response utterance as a new spoken response utterance conversion result for the new response text uttered as natural language generated by the natural language generating unit 157-2, and provide the spoken response utterance to the providing unit 155.

Here, the update unit 156 may update the query text-new spoken response utterance set including a new spoken response utterance for the query text in the database 154, after the second processor 157 has generated the new spoken response utterance. In the present embodiment, the database 154 may include a regular database (not illustrated) and a temporary database (not illustrated). The query text-new spoken response utterance set may be stored in the temporary database, and the query text-spoken response utterance set may be stored in the regular database. A providing frequency of a new spoken response utterance stored in the temporary database and a providing frequency of the spoken response utterance stored in the regular database may be relatively compared for a predetermined period of time, and a query text-new spoken response utterance set for a new spoken response utterance having a higher providing frequency than the providing frequency of the spoken response utterance may be moved from the temporary database to the regular database. The query text-new spoken response utterance set may be changed to a query text-spoken response utterance set after being moved to the regular database. Further, a spoken response utterance having a lower providing frequency than that of the new spoken response utterance may be deleted from the regular database. Moreover, a query text-new spoken response utterance set for a new spoken response utterance having a lower providing frequency than that of the spoken response utterance may be deleted from the regular database. The update unit 156 may update the query text-new spoken response utterance set in the database 154 or delete the query text-new spoken response utterance set from the database 154, based on at least one of the relative providing frequency between the spoken response utterance and the new spoken response utterance, an available storage capacity of the database 154, and a predetermined number of updated query text-spoken response utterance sets. Here, the updating of the query text-new spoken response utterance set in the database 154 may include moving the query text-new spoken response utterance set from the temporary database to the regular database. Further, the deleting of the query text-new spoken response utterance set from the database 154 may include deleting the query text-new spoken response utterance set from the temporary database.

Figure 5:
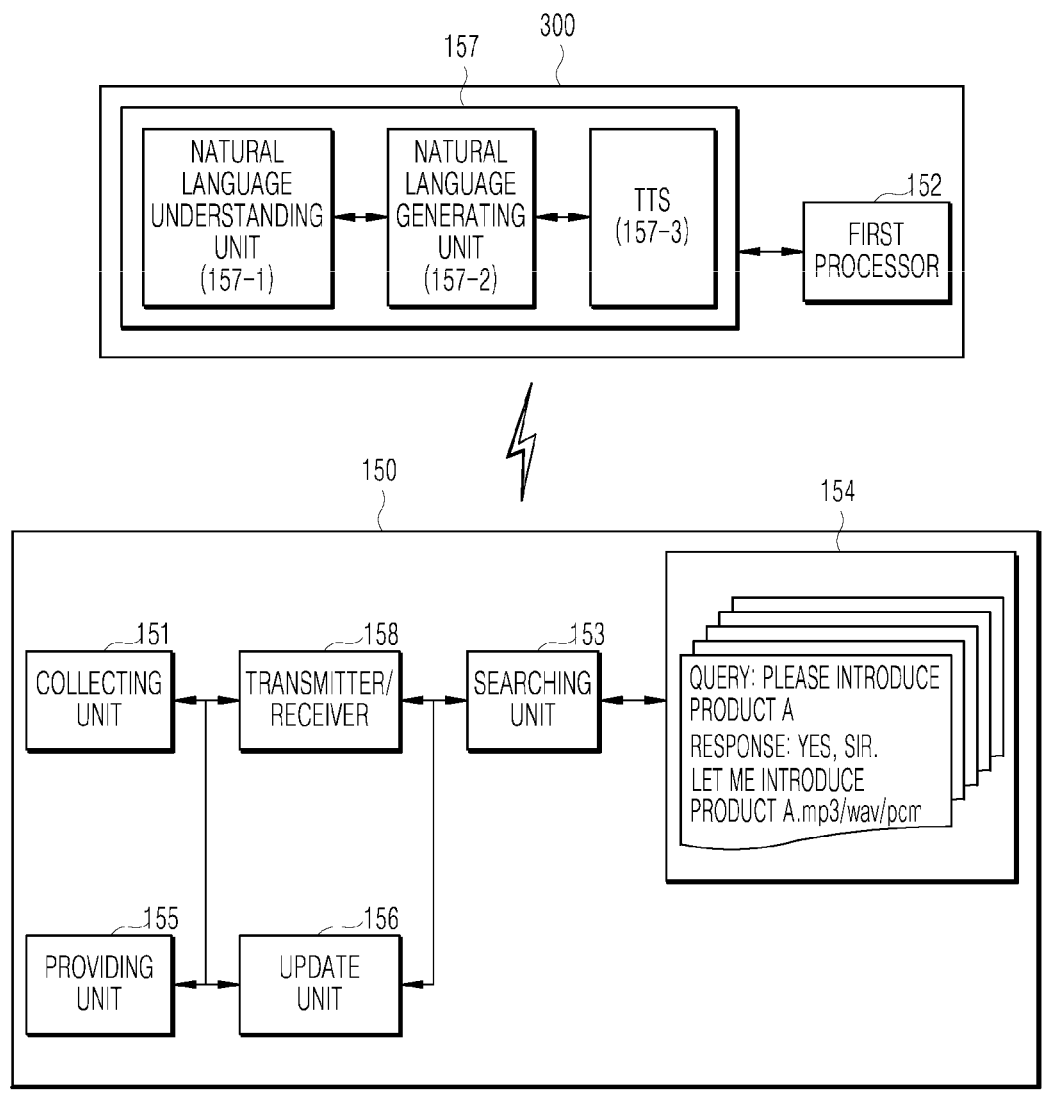
FIG. 5 is a schematic block diagram of an information processor according to another exemplary embodiment of the speech processing apparatus of FIG. 2.

FIG. 5 is a schematic block diagram of an information processor according to another exemplary embodiment of the speech processing apparatus of FIG. 2. Hereinafter, a repeated description of FIGS. 1 to 4 will be omitted. As compared with FIG. 3, an information processor illustrated in FIG. 5 may include a collecting unit 151, a searching unit 153, a database 154, a providing unit 155, an update unit 156, and a transmitter/receiver 158, and a first processor 152 and a second processor 157 may be included in a server 300. That is, the information processor 150 illustrated in FIG. 5 may perform a series of processes for speech recognition, for example, speech to text conversion, natural language understanding, natural language generation, and text to speech conversion in the server 300.

The collecting unit 151 may collect the user's spoken utterance including a query. The transmitter/receiver 158 may transmit the user's spoken utterance including a query to the server 300. Here, the transmitter/receiver 158 may be replaced with the communicator 110 of FIG. 2.

The first processor 152 included in the server 300 may generate a query text as a text conversion result for the user's spoken utterance including a query using an automatic speech recognition (ASR) unit to transmit the query text to the speech processing apparatus 100, and the transmitter/receiver 158 may receive the query text.

The searching unit 153 may search whether there is a query text-spoken response utterance set including a spoken response utterance for the query text in the already constructed database 154.

As a searching result of the searching unit 153, when there is a query text-spoken response utterance set including a spoken response utterance for the query text in the database 154, the providing unit 155 may provide the spoken response utterance included in the query text-spoken response utterance set.

After the providing unit 155 has provided the spoken response utterance, the update unit 156 may update information about the query text-spoken response utterance set in the database 154.

As the searching result of the searching unit 153, when there is no query text-spoken response utterance set including a spoken response utterance for the query text in the database 154, the transmitter/receiver 158 may transmit the query text to the server 300. As a selective embodiment, when there is a query text-spoken response utterance set including a spoken response utterance for the query text in the server 300, the transmitter/receiver 158 may request response utterance information corresponding to the query text.

The second processor 157 included in the server 300 may analyze an utterance intention of the query text, generate a new response text for the analyzed utterance intention of the query text, generate a new spoken response utterance as a speech conversion result for the new response text, and transmit the new spoken response utterance to the speech processing apparatus 100, and the transmitter/receiver 158 may receive the new spoken response utterance and transmit the new spoken response utterance to the providing unit 155.

The update unit 156 may update a query text-new spoken response utterance set including a new spoken response utterance for the query text in the database 154 after receiving the new spoken response utterance from the server 300.

Figure 6:
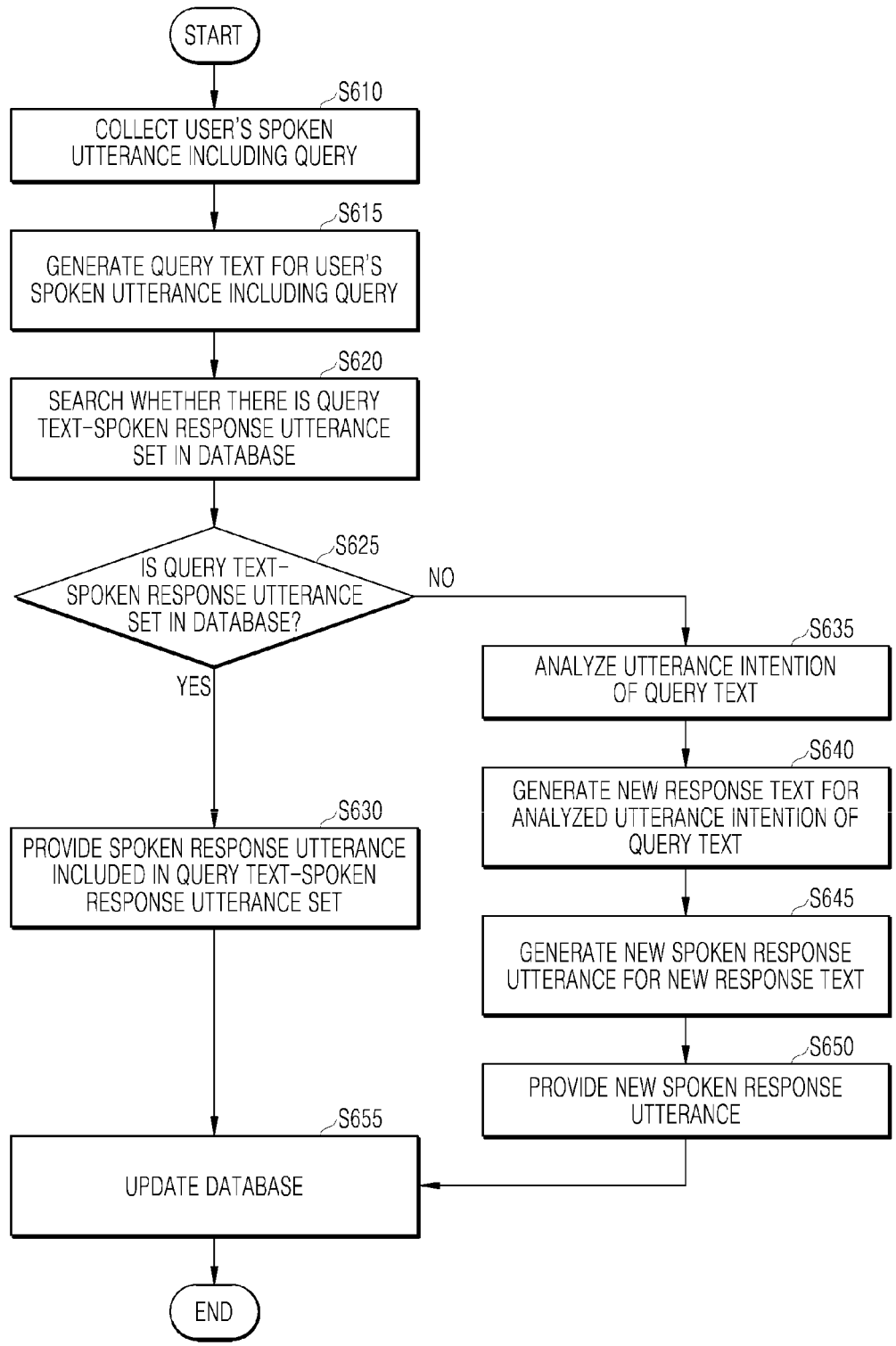
FIG. 6 is a flowchart of a speech processing method according to an exemplary embodiment of the present disclosure.

FIG. 6 is a flowchart of a speech processing method according to an exemplary embodiment of the present disclosure. Hereinafter, a repeated description of FIGS. 1 to 5 will be omitted.

Referring to FIG. 6, in step S610, the speech processing apparatus 100 collects a user's spoken utterance including a query through the audio input unit 141.

In step S615, the speech processing apparatus 100 generates a query text for the user's spoken utterance including a query. The speech processing apparatus 100 may generate the query text for the user's spoken utterance including a query using an automatic speech recognition (ASR) unit (not illustrated) which performs speech to text (STT) conversion.

In step S620, the speech processing apparatus 100 searches whether there is a query text-spoken response utterance set including a spoken response utterance for the query text in a database. Here, the query text may include visual information, and the spoken response utterance may include auditory information. In the database, a query text-spoken response utterance set group in which similar spoken response utterances for the query text are clustered may be stored. The speech processing apparatus 100 may cluster the spoken response utterances based on a similarity of response keywords to generate the query text-spoken response utterance set group, and store the query text-spoken response utterance set group in the database.

In steps S625 and S630, when there is a query text-spoken response utterance set including a spoken response utterance for the query text in the database, the speech processing apparatus 100 provides the spoken response utterance included in the query text-spoken response utterance set. Here, the providing of a spoken response utterance may include providing the spoken response utterance through the audio output unit 142 so as to be heard by the user and/or providing the spoken response utterance through the display 121 so as to be viewed by the user.

In steps S625 and S635, when there is no query text-spoken response utterance set including a spoken response utterance for the query text in the database, the speech processing apparatus 100 performs syntactic analysis or semantic analysis on the query text so as to analyze an utterance intention of the user for the spoken utterance including a query.

In step S640, the speech processing apparatus 100 generates a new response text using a knowledge-base, based on the analyzed utterance intention.

In step S645, the speech processing apparatus 100 generates a new spoken response utterance as a spoken response utterance conversion result for the new response text.

In step S650, the speech processing apparatus 100 provides a new spoken response utterance through the audio output unit 142 and/or the display 121.

In step S650, the speech processing apparatus 100 may update information about the query text-spoken response utterance set in the database or a query text-new spoken response utterance set in the database. The speech processing apparatus 100 may analyze a relative providing frequency history of the query text-spoken response utterance sets from the database. When the providing frequency of the query text-spoken response utterance set is relatively low, for example, lower than a predetermined number of times, as the analysis result of the providing frequency history of the query text-spoken response utterance set, the speech processing apparatus 100 may delete the query text-spoken response utterance set from the database 154. Further, the speech processing apparatus 100 may update the information about the query text-spoken response utterance set in the database or delete the information about the query text-spoken response utterance set from the database, based on at least one of the relative providing frequency of the spoken response utterance included in the query text-spoken response utterance sets, an available storage capacity of the database, and a predetermined number of updated query text-spoken response utterance sets (for example, 20).

Figure 7:
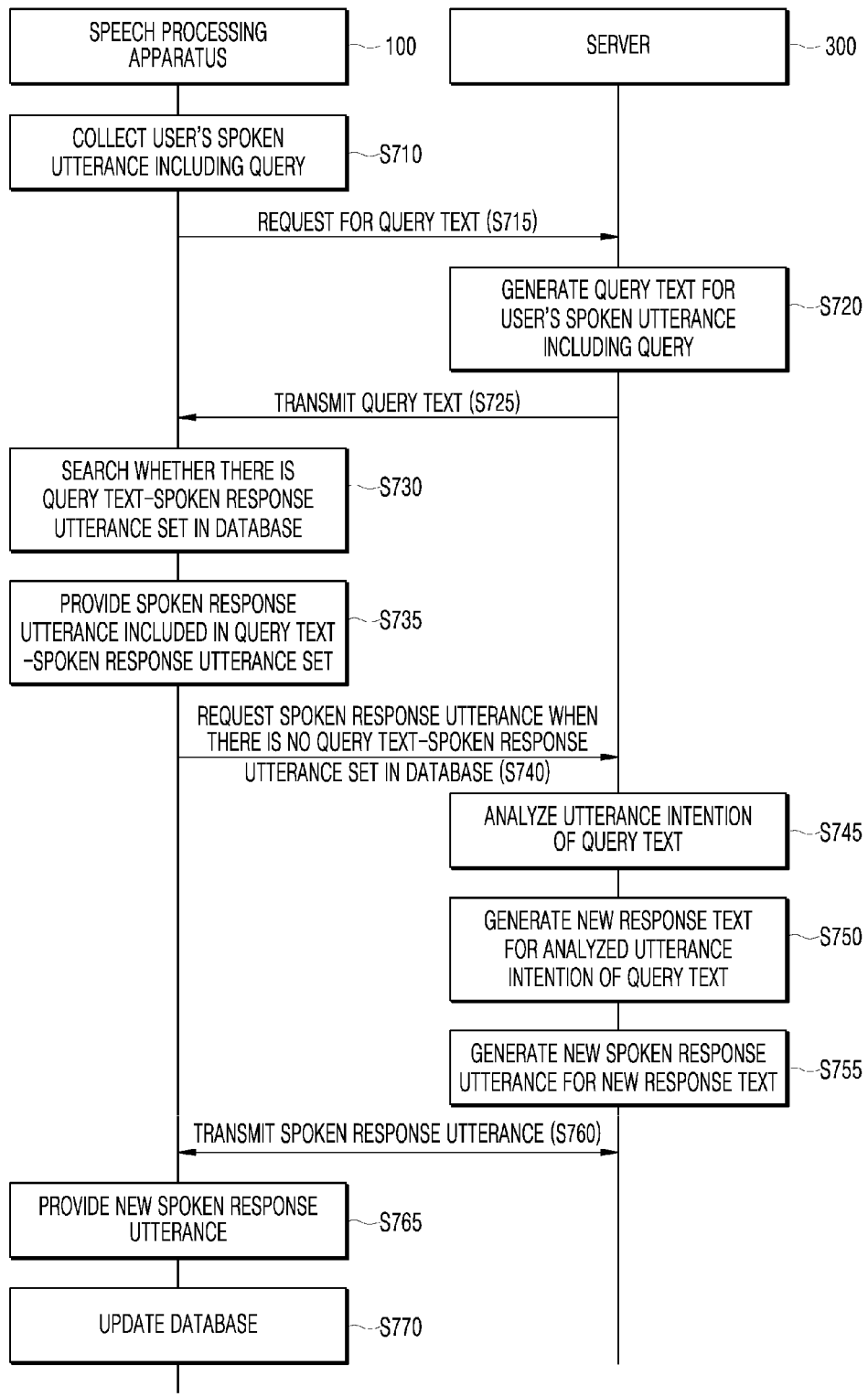
FIG. 7 is a flowchart of a speech processing method according to another exemplary embodiment of the present disclosure.

FIG. 7 is a flowchart of a speech processing method according to another exemplary embodiment of the present disclosure. Hereinafter, a repeated description of FIGS. 1 to 6 will be omitted.

Referring to FIG. 7, in step S710, the speech processing apparatus 100 collects a user's spoken utterance including a query through the audio input unit 141.

In step S715, the speech processing apparatus 100 requests the server 300 for a query text for the user's spoken utterance including a query.

In step S720, the server 300 which has received a request signal generates the query text for the user's spoken utterance including a query using an automatic speech recognition (ASR) unit (not illustrated) which performs speech to text (STT) conversion.

In step S725, the server 300 transmits the query text for the user's spoken utterance including a query to the speech processing apparatus 100.

In step S730, the speech processing apparatus 100 searches whether there is a query text-spoken response utterance set in a database. Here, the query text may include visual information, and the spoken response utterance may include auditory information. In the database, a query text-spoken response utterance set group in which similar spoken response utterances for the query text are clustered may be stored. The speech processing apparatus 100 may cluster the spoken response utterances based on a similarity of response keywords to generate the query text-spoken response utterance set group, and store the query text-spoken response utterance set group in the database.

In step S735, when there is a query text-spoken response utterance set including a spoken response utterance for the query text in the database, the speech processing apparatus 100 provides the spoken response utterance included in the query text-spoken response utterance set through the audio output unit 142 and/or the display 121.

In step S740, when there is no query text-spoken response utterance set including a spoken response utterance for the query text in the database, the speech processing apparatus 100 requests the server 300 for the spoken response utterance.

In step S745, the server 300 performs syntactic analysis and semantic analysis on the query text so as to analyze the utterance intention of the user for the spoken utterance including a query.

In step S750, the server 300 generates a new response text using a knowledge-base, based on the analyzed utterance intention.

In step S755, the server 300 generates a new spoken response utterance as a spoken response utterance conversion result for the new response text.

In step S760, the server 300 transmits the new spoken response utterance to the speech processing apparatus 100.

In step S765, the speech processing apparatus 100 provides a new spoken response utterance through the audio output unit 142 and/or the display 121.

In step S770, the speech processing apparatus 100 updates the query text-new spoken response utterance set in the database.

The example embodiments described above may be implemented through computer programs executable through various components on a computer, and such computer programs may be recorded in computer-readable media. Here, the medium may include magnetic media such as hard discs, floppy discs, and magnetic tapes, optical media such as CD-ROM and DVD, magneto-optical media such as floptical disc, and hardware devices specially configured to store and execute program codes, such as ROM, RAM, and flash memory.

The computer programs may be those specially designed and constructed for the purposes of the present disclosure or they may be of the kind well known and available to those skilled in the computer software arts. Examples of the computer program may include not only machine language codes generated by compilers but also high-level language codes that can be executed by computers using interpreters.

As used in the present application (especially in the appended claims), the terms 'a/an' and 'the' include both singular and plural references, unless the context clearly states otherwise. Unless otherwise defined, the ranges defined herein is intended to include any invention to which values within the range are individually applied and may be considered to be the same as individual values constituting the range in the detailed description of the present disclosure.

The order of individual steps in process claims of the present disclosure does not imply that the steps must be performed in this order; rather, the steps may be performed in any suitable order, unless expressly indicated otherwise. In other words, the present disclosure is not necessarily limited to the order of steps given in the description. All examples described herein or the terms indicative thereof ("for example", "such as", etc.) used herein are merely to describe the present disclosure in greater detail. Therefore, it should be understood that the scope of the present disclosure is not limited to the example embodiments described above or by the use of such terms unless limited by the appended claims. Furthermore, those skilled in the art will readily appreciate that many alternations, combination and modifications, may be made according to design conditions and factors within the scope of the appended claims or their equivalents.

The present disclosure is thus not limited to the example embodiments described above, and rather intended to include the following appended claims, and all modifications, equivalents, and alternatives falling within the spirit and scope of the following claims.

What is claimed is:

1. A speech processing method, comprising:
    collecting a user's spoken utterance including a query;
    generating a query text as a text conversion result for the user's spoken utterance including the query;
    searching whether there is a query text-spoken response utterance set including a spoken response utterance for the query text in a database which is constructed in advance; and
    when there is a query text-spoken response utterance set including a spoken response utterance for the query text in the database, providing the spoken response utterance included in the query text-spoken response utterance set,
    wherein the searching of whether there is a query text-spoken response utterance set includes:
        searching a query text-spoken response utterance set group in which spoken response utterances responsive to the query text are clustered in the database; and
        randomly determining a query text-spoken response utterance set in the query text-spoken response utterance set group to be provided.

2. The speech processing method according to claim 1, wherein the generating of a query text includes:
    transmitting the user's spoken utterance including the query to an external server; and
    receiving, from the external server, a conversion result corresponding to the query text for the user's spoken utterance including the query.

3. The speech processing method according to claim 1, further comprising:
    after the providing of the spoken response utterance, updating information about a query text-spoken response utterance set in the database.

4. The speech processing method according to claim 3, wherein the updating in the database includes:
    updating the information about a query text-spoken response utterance set in the database or deleting the information about a query text-spoken response utterance set from the database, based on at least one of a relative providing frequency of a spoken response utterance included in a query text-spoken response utterance set, an available storage capacity of the database, or a predetermined number of updated query text-spoken response utterance sets.

5. The speech processing method according to claim 1, further comprising:
    after the providing of the spoken response utterance,
    analyzing a relative providing frequency history of query text-spoken response utterance sets stored in the database for every predetermined period of time; and
    deleting, from the database, a query text-spoken response utterance set having a relatively low relative providing frequency among the query text-spoken response utterance sets, as an analysis result.

6. The speech processing method according to claim 1, further comprising:
    when there is no query text-spoken response utterance set including a spoken response utterance for the query text in the database, analyzing an utterance intention of the query text;
    generating a new response text for the analyzed utterance intention of the query text;
    generating a new spoken response utterance as a speech conversion result for the new response text; and
    providing the new spoken response utterance.

7. The speech processing method according to claim 6, wherein the analyzing of an utterance intention of the query text includes:
    analyzing the utterance intention of the query text by performing syntactic analysis or semantic analysis on the query text.

8. A speech processing apparatus, comprising:
    at least one processor configured to:
    collect a user's spoken utterance including a query,
    generate a query text as a text conversion result for the user's spoken utterance including the query,
    search whether there is a query text-spoken response utterance set including a spoken response utterance for the query text in a database which is constructed in advance, and when there is a query text-spoken response utterance set including a spoken response utterance for the query text in the database, provide the spoken response utterance included in the query text-spoken response utterance set, wherein the processor is further configured to search a query text-spoken response utterance set group in which spoken response utterances responsive to the query text are clustered in the database, and randomly determine a query text-spoken response utterance set in the query text-spoken response utterance set group to be provided.

9. The speech processing apparatus according to claim 8, wherein the at least one processor is further configured to transmit the user's spoken utterance including the query to an external server, and receive, from the external server, a conversion result corresponding to the query text for the user's spoken utterance including the query.

10. The speech processing apparatus according to claim 8, wherein the at least one processor is further configured to:
update information about a query text-spoken response utterance set in the database, after the providing of the spoken response utterance.

11. The speech processing apparatus according to claim 10, wherein the at least one processor is further configured to update the information about a query text-spoken response utterance set in the database or delete the information about a query text-spoken response utterance set from the database, based on at least one of a relative providing frequency of a spoken response utterance included in a query text-spoken response utterance set, an available storage capacity of the database, or a predetermined number of updated query text-spoken response utterance sets.

12. The speech processing apparatus according to claim 8, wherein the at least one processor is further configured to, after the providing of the spoken response utterance, analyze a relative providing frequency history of query text-spoken response utterance sets stored in the database for every predetermined period of time, and delete, from the database, a query text-spoken response utterance set having a relatively low relative providing frequency among the query text-spoken response utterance sets, as an analysis result.

13. The speech processing apparatus according to claim 8, wherein the at least one processor is further configured to:
when there is no query text-spoken response utterance set including a spoken response utterance for the query text in the database, analyze an utterance intention of the query text, generate a new response text for the analyzed utterance intention of the query text, generate a new spoken response utterance as a speech conversion result for the new response text, and provide the new spoken response utterance.

14. The speech processing apparatus according to claim 13, wherein the at least one processor is further configured to analyze the utterance intention of the query text by performing syntactic analysis or semantic analysis on the query text.

15. A speech processing apparatus, comprising:
at least one processor configured to:
collect a user's spoken utterance including a query,
generate a query text as a text conversion result for the user's spoken utterance including the query,
search a query text-spoken response utterance set group in which spoken response utterances responsive to the query text are clustered in a database, and randomly determine a query text-spoken response utterance set in the query text-spoken response utterance set group to be provided, and
provide a spoken response utterance included in the randomly determined query text-spoken response utterance set.

* * * * *